Oct. 30, 1945.    R. W. McBRIEN    2,387,923
DISPENSING APPARATUS FOR LIQUIDS
Filed Aug. 12, 1943    3 Sheets-Sheet 3
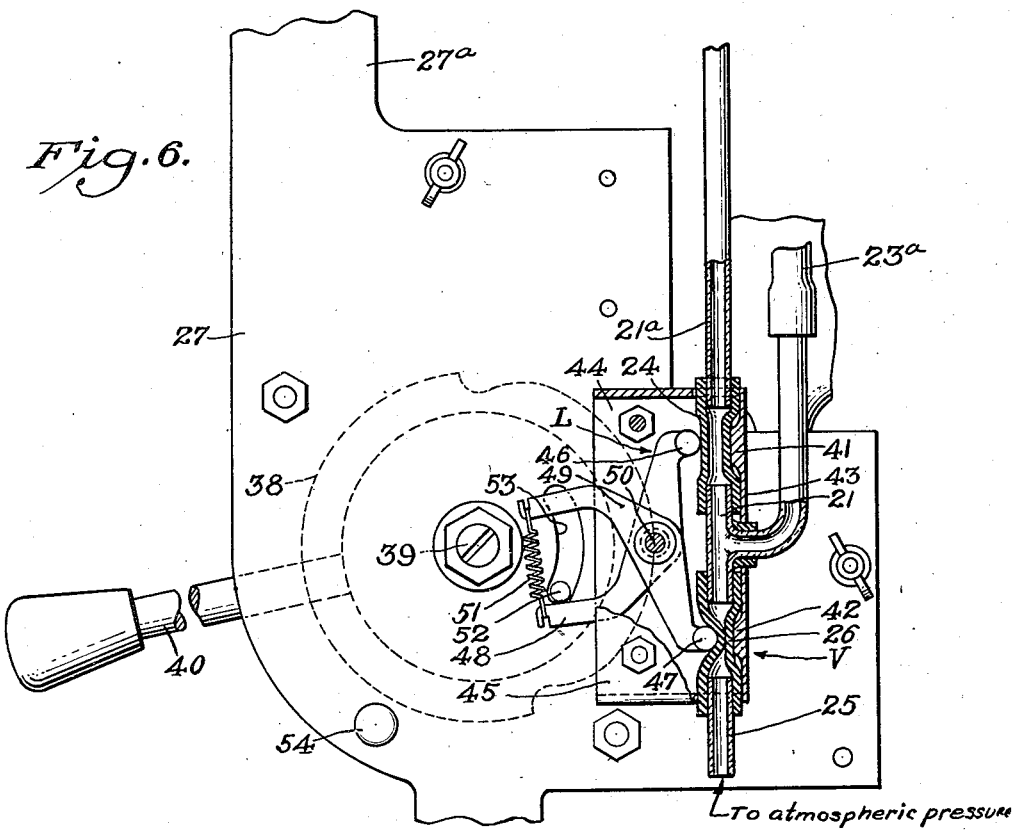
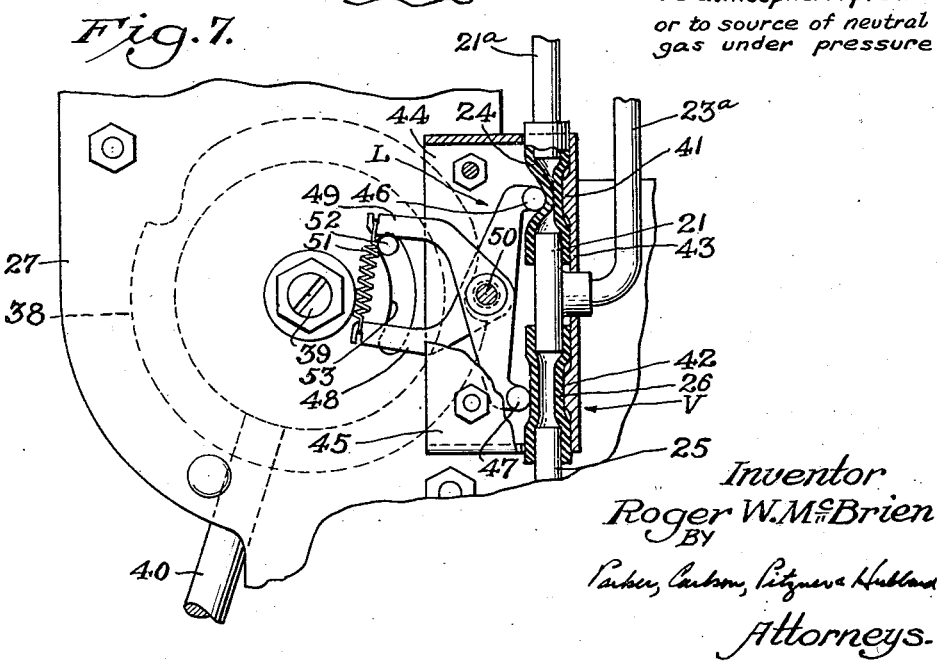
Inventor
Roger W. McBrien
BY
Parker, Carlson, Pitzner & Hubbard
Attorneys.

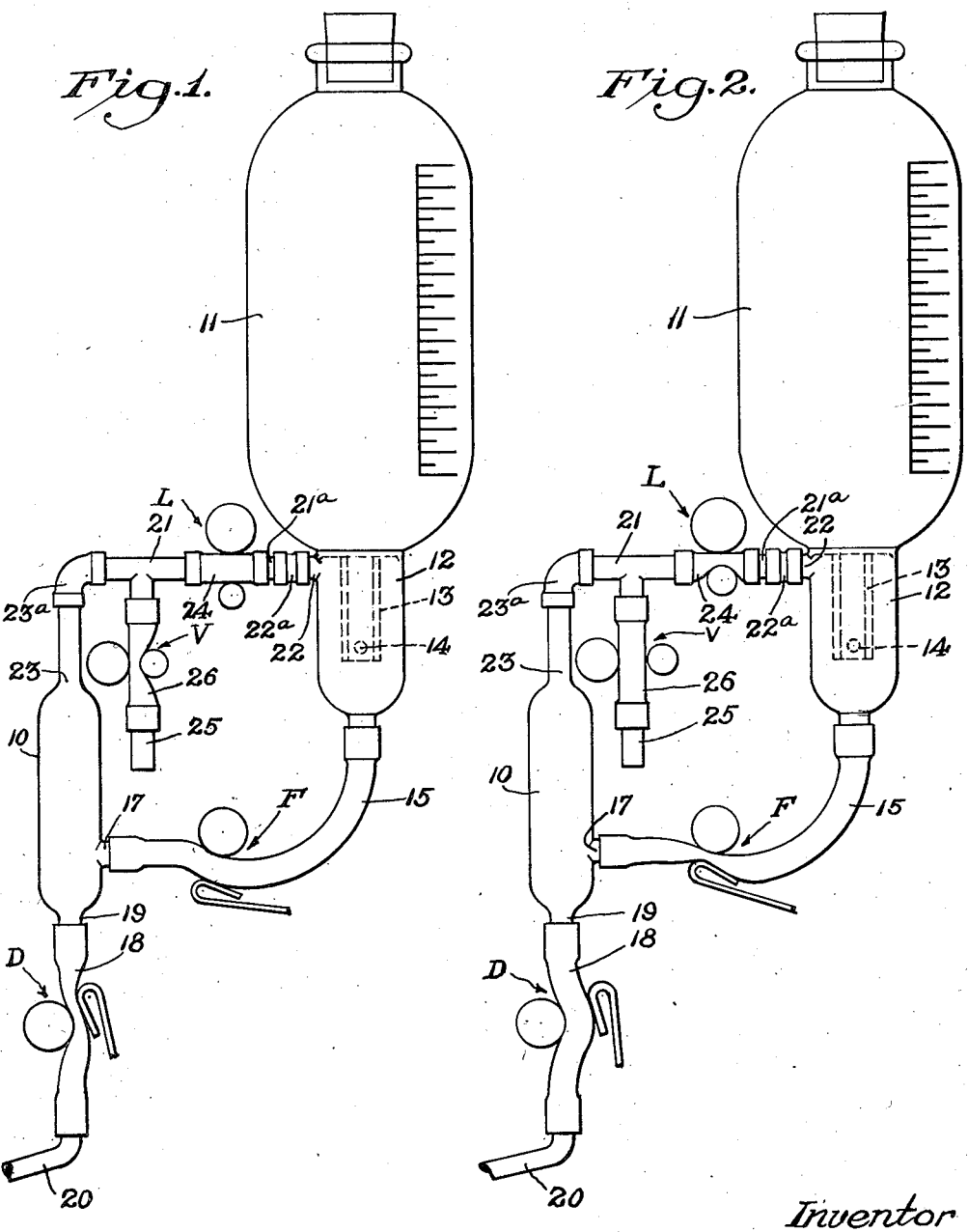

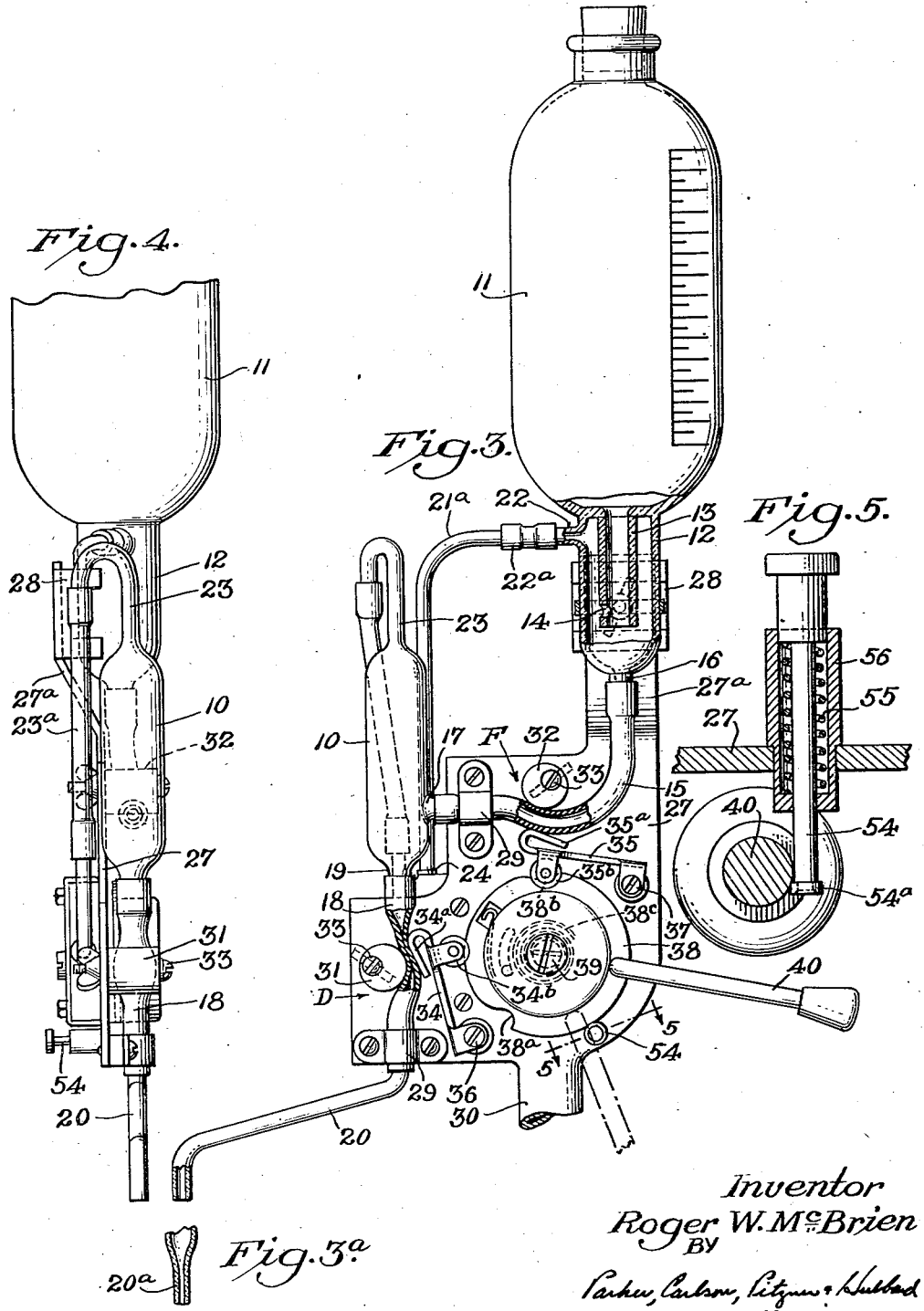

Patented Oct. 30, 1945

2,387,923

UNITED STATES PATENT OFFICE 2,387,923

DISPENSING APPARATUS FOR LIQUIDS

Roger William McBrien, Alton, Ill.

Application August 12, 1943, Serial No. 498,294

17 Claims. (Cl. 222—445)

The present invention relates to improvements in apparatus for dispensing measured quantities of liquids.

More particularly, the present invention is an improvement upon that disclosed in my earlier application, Serial No. 466,701, filed November 23, 1942. The latter discloses a liquid dispensing apparatus in which successive quantities of liquid are fed by gravity from an elevated container into a measuring receptacle, in each instance to a predetermined level in the receptacle fixed by a constant level device. The constant level device comprises a well into which the container opens below the normal liquid level in the well and atmospheric pressure is applied to the liquid in both the well and receptacle through a standpipe rising to the height of the container.

The principal object of the present invention is to provide a dispensing device of the general type indicated above, but in which the standpipe heretofore noted is eliminated, thus obviating danger of breakage of this protruding part while facilitating compact design and easy enclosure, and in which provision is made for sealing the liquid in the apparatus from atmosphere, thus making it possible to measure highly volatile liquids with the apparatus and to avoid inaccuracies resulting from changes in barometric pressure and in temperature.

To put it another way, I aim to provide a dispensing apparatus employing a simple constant level device of the class above set forth for determining the successive measured quantities of liquid to be dispensed, but in which the system may be entirely sealed from atmosphere despite the fact that such constant level devices normally depend upon atmospheric pressure for their operation.

The invention also resides in a novel and simplified mechanism for actuating a plurality of valves in the apparatus in timed relation to each other.

Further objects and advantages of the invention will be apparent as the following description proceeds, taken in connection with the accompanying drawings, in which:

Figures 1 and 2 are generally schematic layouts of a measuring type dispensing apparatus embodying the invention, showing the same with its valves conditioned, respectively, for filling and emptying of the measuring receptacle.

Fig. 3 is a fragmentary front elevation, partially in section, of the dispensing apparatus embodying the invention.

Fig. 3a is a fragmentary detail view of a modified form of terminal end for the spout for use in dispensing the liquid in drops.

Fig. 4 is a fragmentary end elevation of the apparatus of Fig. 3.

Fig. 5 is an enlarged detail sectional view taken substantially along the line 5—5 in Fig. 3.

Figs. 6 and 7 are enlarged fragmentary rear elevations, partially in section, of the central portion of the apparatus of Fig. 3, showing the two alternative positions of the level control and vent valves of the apparatus.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the exemplary schematic layout of the apparatus shown in Figs. 1 and 2, the principal elements illustrated include a measuring receptacle 10, an elevated container 11 for a reserve supply of the liquid to be dispensed, and a constant level device comprising a well 12 into which depends an open end outlet extension 13 on the container having an orifice 14 in its side. All of these parts are desirably made of glass, the upper margins of the well 12 being fused to the exterior of the container 11 (see also Fig. 3) to seal the same. For filling the measuring receptacle 10 from the container 11 a filling connection is provided comprising a flexible rubber tube 15 leading from an outlet 16 at the bottom of the well 12 to an inlet 17 in the lower side wall of the measuring receptacle. Discharge of the contents of the measuring receptacle 10 is, on the other hand, accomplished through a flexible rubber tube 18 leading from an outlet 19 on the bottom of the receptacle to a discharge spout 20 adapted to direct the liquid into any suitable receiver (not shown).

Intercommunication of the measuring receptacle 10 with the well 12 at a point above the normal liquid levels therein to equalize the pressures within these vessels, while still retaining the latter sealed from the atmosphere, is effected through a pressure equalizing connection comprising glass tubes or conduits 21, 21a joined to a pressure inlet 22 in the upper portion of the well 12 by a rubber tube 22a and joined to a pressure inlet 23 in the top of the receptacle 10 by a rubber tube 23a, there being a length of flexible rubber tube 24 interposed between the conduits 21, 21a. With the outlet 19 of the measuring receptacle 10 closed and the filling and pressure equalizing connections open between the lower and upper portions, respectively, of the well and measuring receptacle, liquid will flow downward from the container 11 through the outlet 16 of the well and into the measuring receptacle 10, rising in both the measuring receptacle and well to the top of the port 14. The measuring receptacle 10 is thus filled to a predetermined level fixed by the location of this latter port 14 of the constant level device. In this way each refilling of the measuring receptacle is always accomplished up to the same fixed point determined by the port 14.

Four valves F, D, L and V are included in the illustrated apparatus. All four of these valves have been shown as pinch cocks comprising a fixed abutment located at one side of a length of flexible tubing and a cooperating finger or movable abutment arranged to collapse the tube against the fixed abutment. The filling valve F is interposed in the filling connection between the lower portions of the well 12 and measuring receptacle 10, while the discharge valve D is located in the outlet line from the measuring receptacle. On the other hand, the level valve L is located in the pressure equalizing line 21 between the upper portions of the well and measuring receptacle, while the vent valve V is arranged to close a vent connection 25 communicating with the upper portion of the measuring receptacle through a rubber tube 26 and a portion of the line 21. The term "vent" as used in the specification and claims includes either a connection to atmospheric pressure or to a suitable source of neutral gas under pressure (not shown). The filling and discharge valves F and D are operated in alternation, as are the level and vent valves L and V, the operation of all four valves being timed with respect to each other.

The general program of operation followed is to open the filling valve F and level valve L while having the discharge valve D and vent valve V closed, in order to fill the measuring receptacle 10 with liquid from the container 11 up to the fixed level determined by the port 14. Having thus filled the measuring receptacle, the level valve L and filling valve F are closed, thereby disconnecting the well 12 from the receptacle 10 at both top and bottom. Then the discharge valve D is opened, as well as the vent valve V, thereby permitting the gravity discharge of the contents of the measuring receptacle through the spout 20, augmented by additional pressure supplied through the vent valve V in the event that the vent is connected to a source of gas under pressure.

Turning now to the structural features of the actual apparatus, which are shown in more or less detailed form in Figs. 3 to 7, it will be observed that the container 11 is fixed to an upright arm 27a on a vertical mounting plate 27 by a clamp 28 embracing the well 12. Suitable straps 29 secure the measuring receptacle 10 and associated connections to this same mounting plate, the latter being fixed on a standard, a fragment of whose upper portion appears at 30 (Fig. 3). The valves D and F are located on the face of the mounting plate 27 which appears in Fig. 3, and may be termed the front face, while the other two valves V and L are located on the opposite or rear side shown in Figs. 6 and 7. Such disposition of the parts facilitates assembly and such arrangement of the valves facilitates their coordinated actuation in the manner hereinafter described.

The valves or pinch cocks D, F comprise respective cylindrical abutments 31, 32 adjustably supported by eccentric screws 33 at one side of their respective flexible tubes 18 and 15. Coacting with these abutments 31, 32 are respective fingers 34, 35 disposed with their active ends on the sides of the tubes 18, 15 opposite the abutments and adapted to pinch the intervening portions of the tubes against the corresponding abutments. The fingers 34, 35 are preferably fashioned as sheet metal stampings, being pivoted on the supporting plate 27 at 36, 37 to swing toward and away from the adjacent tubes 18, 15. The outer end portions of the fingers 34, 35 are doubled back upon themselves in smoothly curved configuration as indicated at 34a, 35a to present smooth active surfaces of fairly large area for pinching the intervening portion of the tube firmly against the corresponding stationary abutment while minimizing damage to the tube itself during repeated use.

To actuate the valves D and F, a peripheral cam 38 (Fig. 3) is utilized. This cam is fashioned as a sheet metal stamping, being generally cup-shaped in configuration and having a peripheral flange presenting notches 38a and 38b. The cam 38 is rotatably mounted on the supporting plate 27 by a screw at 39. A helical torsion spring 38c, having its opposite ends anchored respectively to the cam and the supporting plate, normally urges the cam to turn in a counterclockwise direction (as viewed in Fig. 3). An operating handle 40 fixed to the cam 38 and projecting radially from it is provided for turning the same. Coacting with the cam 38 are cam follower rollers 34b and 35b carried by integral ears on the respective fingers 34 and 35. The resiliency of the rubber tubes 18, 15 normally urges the fingers 34, 35 inward for contact of the rollers 34b, 35b with the periphery of the cam 38. The notches 38a, 38b are provided in the latter at suitably spaced points so that the cam follower rollers 34b, 35b will alternately drop into their respective notches 38a, 38b upon oscillation of the cam 38 through an arc of approximately thirty degrees, i. e., between the two positions indicated by the full line and dot-dash line showings of the operating handle 40 in Fig. 3.

The other pair of valves or pinch cocks L and V, which are located on the reverse side of the mounting plate 27 (see Figs. 6 and 7) comprise stationary abutments 41 and 42 fashioned as flat-faced protrusions on a flange 43 extending along the side edge of a plate 44 which is bolted to the supporting plate 27. A plate 45 rests on the edge flanges of the plate 44 as a cover, being bolted in place, and cooperates therewith to form a protective enclosure for the valves L and V.

Coacting with the stationary abutments 41, 42 of the valves L and V are corresponding movable abutments in the form of projections 46, 47 on the ends of levers 48, 49, respectively. Such levers 48, 49 are crossed, being pivoted intermediate their ends and at their point of crossing on a pin 50. The levers 48, 49 are shaped in the form of oppositely facing bell crank levers and their outer ends are yieldably urged toward each other by a tension spring 51. Such bias of the levers 48, 49 toward each other tends to swing them in a direction to force the abutments 46, 47 thereon into pinching engagement with the respective flexible tubes 24, 26.

Actuation of the valves V and L in timed relation with the cam operated valves D and F is accomplished by a pin 52 fixed on the inner side of the cam 38 and projecting through an arcuate slot 53 in the supporting plate 27. The projecting end of this pin 52 lies between the portions of the crossed levers 48, 49 which are biased toward each other. In the two alternate positions of the operating lever 40, shown, respectively, in Figs. 6 and 7, the pin 52 engages alternate ones of the levers 48 and 49 so that corresponding ones of the valves L and V are closed in such two positions.

The torsion spring 38c for the cam 38 normally biases the same to the position shown in full lines in Fig. 3 (also shown in Fig. 6). In such case the valves D and V are closed, while the valves F and L are open. In other words, the valves are conditioned as illustrated in Fig. 1 for filling of the measuring receptacle 10. On the other hand, when the operating handle 40 is swung downward to the position shown in dot-dash lines in Fig. 3 (also shown in Fig. 7) the valves occupy the position shown diagrammatically in Fig. 2 for discharge of the measuring receptacle's contents; in other words, the valves D and V are open while the valves L and F are closed. The operating handle 40 may conveniently be releasably retained in the latter position by latch pin 54 (Figs. 3, 4 and 5). This pin is slidably mounted within a bushing 55 staked in the mounting plate 27, being yieldably biased outward by a compression spring 56. When the latch pin 54 is manually thrust inward behind the shank of the handle 40, a head 54a on the latch pin frictionally engages the handle so as to retain the latch pin in its blocking position shown in Fig. 5. Moving the handle 40 slightly in a clockwise direction frees the latch pin 54 so that it is permitted to snap back into its non-blocking position.

Use of the latch 54 is made primarily in connection with dispensing the contents of the measuring receptacle drop-by-drop. Various occasions arise for that type of dispensing. For example, in some industrial processes it is desirable to dispense a measured quantity of acid in drops for testing the quality of a plating. In such case the spout 20 may be equipped with an elongated restricted outlet 20a (Fig. 3a) shaped like that in the familiar medicine dropper. In dispensing the contents of the receptacle 10 the handle 40 is latched in its lowered or discharge position. Thereafter the operator can go away and leave the apparatus with the assurance that a predetermined number of drops, determined by the volume of liquid previously trapped in the receptacle 10, will be emitted drop-by-drop from the spout 10a. The time and tedium otherwise attendant upon conducting such a test are thus obviated.

The operation of the disclosed apparatus will, in general, be clear from the foregoing. By way of brief résumé, it may be noted that the operating handle 40 is positioned as shown in full lines in Fig. 3 (also shown in Fig. 6) for filling. A reserve supply of the liquid to be measured is provided in the reservoir 11, its contents being replenished from time to time as required by filling it from the opening in its top. During use this opening is tightly stoppered to seal the contents of the reservoir from atmosphere. With the parts positioned as described, the valves D and V are closed, while the valves L and F are open. Consequently liquid flows down from the reservoir 11 into the well 12 and thence through the filling tube 15 into the measuring receptacle 10. The liquid rises in the latter receptacle to a fixed level determined by the port 14 in the constant level device. The inlet 23 of the receptacle 10 comprises a capillary tube of fine bore so that any small error in level of the liquid in it constitutes but a negligible percentage of the total volume of liquid received in the receptacle 10. The pressure of the air or other gas trapped above the level of the bodies of liquid in the well 12 and receptacle 10 (equalized through connection 21) maintains the column of liquid in the container 11 above the level of the port 14.

Having thus filled the measuring receptacle 10, the operator has only to push down on the lever 40, swinging it to the position shown in dot-dash lines in Fig. 3 (also shown in Fig. 7), whereupon the valves F and L are closed and the valves D and V open. As a consequence, the contents of the measuring receptacle is discharged through the spout 20, its gravity flow through the opened discharge valve D being augmented by pressure admitted at V. Escape of fluid from the reserve supply is prevented at this time by the closed valves L and F. Refilling of the measuring receptacle is accomplished by simply swinging the lever 40 back up to its initial position. This operation is repeated and continued for the dispensing of successive equal increments of liquid. Each downward stroke of the handle 40 dispenses another measured increment of liquid and each restoration of the handle to its upper position effects an automatic refilling of the measuring receptacle.

The actuating arrangement heretofore described for the several valves D, F, L and V is such that they are all operated in predetermined timed relation with respect to each other. The condition of the same for filling and discharge of the receptacle has heretofore been described and is respectively shown diagrammatically in Figs. 1 and 2. Attention should also be given, however, to the transition of the valves from the condition of Fig. 1 to that of Fig. 2. During such transition, the pin 52 first releases the lever 48 so that the valve L closes during the first few degrees of movement of the operating handle 40 and at a time substantially prior to the engagement of this pin 52 with the other lever 49, wherefore both the valves L and V are closed during most of the period of movement of the lever 40 from its uppermost position to its lowermost position. As the lever 40 continues its downward movement following the closing of the valve V, the cam follower roller 35b rides up out of the notch 38b thereby closing the valve F. At substantially the end of the downward stroke of movement of the lever 40, the pin 52 contacts the lever 49, opening the valve V, and after only a few degrees of further downward movement of the lever 40 the roller 34b drops into the notch 38a, thereby opening the valve D. In shifting of the lever 40 upward from the discharge position to the filling position, the actuation of the valves takes place in the reverse sequence. The timing described insures proper opening or closing of all of the other valves before the opening of either the valve F or valve D for filling and discharge, respectively. It also precludes the possibility of simultaneous opening of valves V and L.

From the foregoing it will be appreciated that a simple and highly effectual arrangement has been provided for dispensing accurately measured quantities of liquid. It has the important advantage that whereas each successive quantum of liquid is determined by a simple constant level device of a form commonly dependent upon atmospheric pressure for its operation, that nevertheless the system can be entirely sealed from atmosphere, thus making possible its use in dispensing volatile or readily oxidizable liquids.

I claim as my invention:

1. Apparatus for dispensing liquid in measured quantities comprising, in combination, a container sealed from atmospheric pressure, a constant level well into which the lower end of said container projects, a measuring receptacle having a valved outlet for discharge of its contents, a filling connection from the well to said receptacle, a pressure equalizing connection between the respective upper portions of said well and receptacle, a valve for closing said equalizing connection, and a valve-controlled vent communicating with the upper portion of said receptacle.

2. Apparatus for dispensing liquid, comprising in combination, a measuring receptacle and a constant level device both sealed from the atmosphere, a filling connection and a pressure equalizing connection extending from said constant level device to said receptacle and communicating with the latter respectively below and above the normal liquid level therein established by said constant level device, a discharge connection extending from said receptacle, and valve means for closing said last two connections in alternation.

3. Apparatus for dispensing liquid in measured quantities comprising, in combination, a container adapted to hold a supply of liquid, a measuring receptacle having a valve outlet leading from its lower portion, means including a constant level device having a well communicating with said container and with the lower portion of said receptacle for filling the latter to a level determined by the constant level device, both said container and said well being sealed from the atmosphere and having a pressure equalizing connection between their upper portions communicating with the same above the normal liquid levels therein, and a valved connection for venting the upper portion of said receptacle and said well.

4. Apparatus for dispensing liquid in measured quantities comprising, in combination, a measuring receptacle, means including a constant level device communicating with the lower portion of said receptacle for filling the latter to a level determined by the constant level device, both said receptacle and said constant level device being sealed from the atmosphere and having a pressure equalizing connection between their upper portions communicating with the same above the normal liquid levels therein established by said constant level device, a vent for the upper portion of said receptacle, a first valve for closing the filling connection to said receptacle, a second valve for closing said equalizing connection, a third valve for closing said vent, and means for operating all three of said valves in timed relation to each other to close said first and second valves and open said third valve to accommodate discharging of the measuring receptacle's contents and, alternatively, to open said first and second valves and close said third valve for refilling of the measuring receptacle.

5. Apparatus for dispensing liquid in measured quantities comprising, in combination, a measuring receptacle having an outlet in its lower portion, means including a constant level device having a well communicating with the lower portion of said receptacle for filling the latter to a level determined by the constant level device, both said receptacle and said well being sealed from the atmosphere and having a pressure equalizing connection between their upper portions communicating with the same above the normal liquid levels therein established by said constant level device, a vent for the upper portion of said receptacle, a first valve for closing the filling connection from said well to said receptacle, a second valve for closing said equalizing connection, a third valve for closing said vent, a fourth valve for closing said outlet of the measuring receptacle, and means for operating all four of said valves in timed relation to each other to close said first and second valves and open said third and fourth valves for discharge of the measuring receptacle's contents and, alternatively, to open said first and second valves and close said third and fourth valves for refilling the measuring receptacle.

6. In an apparatus of the type described, the combination of a vertical supporting plate having a measuring receptacle and a constant level device mounted on one side face thereof, filling and pressure equalizing connections extending between said measuring receptacle and constant level device and communicating with the former respectively below and above the normal liquid level therein determined by said constant level device, said measuring receptacle having an outlet in its lower portion, respective valves for said outlet and said filling connection disposed on said one side face of the supporting plate, a valve for said equalizing connection together with a valve-controlled vent for the upper portion of said receptacle disposed on the opposite side of said plate, means including an actuating cam mounted on said one side of said plate for actuating said filling and outlet valves in timed relation to each other, and means operable in timed relation with the movement of said cam for actuating said equalizing and vent valves.

7. In an apparatus of the type described, the combination of a measuring receptacle having an inlet and an outlet, means including a plurality of valves for controlling the flow of fluid into and out of said receptacle, an oscillatable actuator for opening and closing at least one of said valves upon movement of said actuator in respectively opposite directions, a pair of valve actuating levers pivoted intermediate their ends at a common point and disposed with portions thereof in spaced relation, means yieldably urging said spaced portions of the levers toward each other, and means for swinging alternate ones of said pair of levers in a direction away from its companion in response to movement of said oscillatable actuator in respectively opposite directions to effect alternate operation of valves controlled by said levers in timed relation with the operation of the first-mentioned valve by said oscillatable actuator.

8. In an apparatus of the type described, the combination of a measuring receptacle having an inlet and an outlet, means including a plurality of valves for controlling the flow of fluid into and out of said receptacle, means including an oscillatably mounted peripheral cam for alternately opening and closing at least one of said valves in response to oscillation of said cam in respectively opposite directions, means including a pair of crossed levers pivoted at their point of crossing for actuating respective ones of a pair of said valves, spring means urging said levers toward each other, and a lateral projection on said cam interposed between said crossed levers and arranged to swing alternate ones of said levers away from its companion upon movement of said cam in respectively opposite directions to effect alternate operation of valves controlled by said levers in timed relation with the operation of said one valve by said cam.

9. In a dispensing apparatus, the combination of a measuring receptacle having a restricted outlet for discharge of its contents drop-by-drop, a container for a reserve supply of liquid, control means including a plurality of valves for alternately filling said receptacle with a predetermined quantity of liquid from said container with said outlet closed and opening said outlet with the receptacle disconnected from said container for discharge of the receptacle's contents, means including an actuator shiftable between alternate filling and discharge positions for conditioning said control means respectively for said alternately available filling and discharge actions, means normally biasing said actuator to its filling position in which said receptacle outlet is closed, thereby preventing inadvertent discharge of liquid therefrom, and means for releasably latching said actuator in its discharge position during the drop-by-drop discharge of the receptacle's contents through said outlet.

10. Apparatus for dispensing liquid in measured quantities comprising, in combination, a normally closed container, a constant level well sealed to the lower portion of said container, a discharge tube communicating with said container and projecting into the constant level well to form therewith a constant level device, a measuring receptacle having its upper portion on a level with the normal liquid level in the constant level device and having a valved outlet for discharge of its contents, a filling connection from the well to the receptacle, a pressure equalizing connection between said well and said receptacle above the normal liquid level, a valve for closing said filling connection, and a valve-controlled vent communicating with said receptacle above the normal liquid level therein.

11. In apparatus for dispensing liquid in measured quantities the combination of a container sealed from atmospheric pressure, a constant level well sealed to the lower portion of the container, said container having a portion projecting into the constant level well and forming therewith a constant level device, a measuring receptacle having its major portion disposed below the normal liquid level in the constant level device and having a valved outlet for discharge of its contents, a valved filling connection extending from the bottom of the well to the lower portion of the receptacle, a pressure equalizing connection between said well and said receptacle above the normal liquid level, a valve for closing the equalizing connection, a valve-controlled vent communicating with said receptacle above the normal liquid level therein, and means for controlling the valves including actuators operative to effect closure of the outlet and vent when the filling connection and equalizing connection are open for filling of the receptacle.

12. Apparatus for dispensing liquid in measured quantities having, in combination, a container sealed from atmospheric pressure, means forming a closed well disposed below said container, a discharge tube communicating with said container and projecting into said well to form therewith a constant level device, a measuring receptacle having a valved outlet for the discharge of its contents, a filling connection from said well to said receptacle, a pressure equalizing connection between the respective upper portions of said well and said receptacle, and a valve-controlled vent for admitting air to the upper portion of said well and said receptacle to compensate for liquid dispensed from the apparatus.

13. A liquid measuring and dispensing device having, in combination, a constant level liquid well including a sealed chamber, a sealed measuring receptacle having its major portion disposed below the normal level of the liquid in said well, means providing two connections between said well and said receptacle, one of said connections communicating with the well and the receptacle below said normal liquid level to provide for the filling of the receptacle from the well, the other of said connections communicating with the well and the receptacle above said normal liquid level for equalizing the pressure therein, a valved outlet for emptying said receptacle, and valved vent means for admitting air to said receptacle to permit the emptying of the same.

14. A liquid measuring and dispensing device having, in combination, a constant level liquid well including a sealed chamber, a sealed measuring receptacle having its major portion disposed below the normal level of the liquid in said well, means providing two connections between said well and said receptacle, one of said connections communicating with the well and the receptacle below said normal liquid level to provide for the filling of the receptacle from the well, the other of said connections communicating with the well and the receptacle above said normal liquid level for equalizing the pressure therein, an outlet for emptying said receptacle, a normally closed vent communicating with said receptacle through said pressure equalizing connection, and means operable to close said filling connection and to open said outlet and said vent for emptying the receptacle.

15. In apparatus for dispensing liquid in measured quantities, the combination of a liquid container, a well disposed below said container, both said container and said well being sealed from atmospheric pressure, a discharge tube communicating with said container and projecting into said well to form therewith a constant level device, a measuring receptable having its major portion disposed below the normal liquid level in said constant level device and having a valved outlet for the discharge of its contents, a valved filling connection extending from the lower portion of said well to the lower portion of said receptacle, a pressure equalizing connection extending between said well and said receptacle above the normal level of the liquid therein, a valve-controlled vent for admitting air to said well and said receptacle above the normal liquid level therein, and means for controlling said valved connections including actuators operative to effect closure of said outlet and said vent when the filling connection is opened for filling the receptacle.

16. Apparatus for dispensing liquid in measured quantities comprising, in combination, a measuring receptacle, means including a constant level device having a connection with the lower portion of said receptacle for filling the latter to a level determined by a constant level device, both said receptacle and said constant level device being sealed from the atmosphere and having a pressure equalizing connection communicating therewith above the normal liquid level established by said constant level device, a discharge connection for said receptacle, a vent for said receptacle and said device, a first valve for controlling said filling connection to said receptacle, a second valve for controlling said discharge connection, a third valve for controlling said vent, and means for operating said valves in predetermined timed relation, said first valve being closed and said second and third valves being opened to effect the discharge of the contents of said measuring receptacle and, alternatively, said first valve being opened and said second and third valves being closed for refilling said receptacle from said device.

17. Apparatus for dispensing liquid in measured quantities comprising, in combination, a measuring receptacle having an outlet in its lower portion, means including a constant level device having a connection with the lower portion of said receptacle for filling the latter to a level determined by the constant level device, both said receptacle and said device being sealed from the atmosphere and having a pressure equalizing connection between their upper portions communicating with the same above the normal liquid level therein established by said constant level device, a vent for said receptacle and said device, a first valve for controlling the filling connection from said device to said receptacle, a second valve for controlling the outlet from said receptacle, a third valve for controlling said vent, and manually operable means for operating said valves in predetermined timed relation to each other to close said first valve and open said second and third valves for discharging the contents of said measuring receptacle, and, alternatively, to open said first valve and close said second and third valves for refilling the measuring receptacle.

ROGER WILLIAM McBRIEN.